(12) United States Patent
McCollum et al.

(10) Patent No.: US 7,933,964 B2
(45) Date of Patent: Apr. 26, 2011

(54) SHELL SESSIONS

(75) Inventors: Raymond W. McCollum, Redmond, WA (US); Alexander Nosov, Bellevue, WA (US); Brian Reistad, Redmond, WA (US); Johannes Helander, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 712 days.

(21) Appl. No.: 11/469,411

(22) Filed: Aug. 31, 2006

(65) Prior Publication Data

US 2007/0192502 A1  Aug. 16, 2007

Related U.S. Application Data

(60) Provisional application No. 60/773,954, filed on Feb. 16, 2006.

(51) Int. Cl.
*G06F 15/16* (2006.01)
(52) U.S. Cl. ........ 709/207; 709/206; 709/237; 709/205; 709/223; 726/5
(58) Field of Classification Search .................. 709/205, 709/206, 207, 223, 237; 726/5
See application file for complete search history.

(56) References Cited

U.S. PATENT DOCUMENTS

| | | | |
|---|---|---|---|
| 5,471,564 A | 11/1995 | Dennis et al. | |
| 5,650,995 A | 7/1997 | Kent | |
| 5,764,228 A | 6/1998 | Baldwin | |
| 5,991,814 A * | 11/1999 | Rzonca et al. | ................ 709/237 |
| 6,286,035 B1 | 9/2001 | Gillis et al. | |
| 6,405,365 B1 | 6/2002 | Lee | |
| 6,438,612 B1 | 8/2002 | Ylonen et al. | |
| 6,470,346 B2 | 10/2002 | Morwood | |
| 6,654,815 B1 | 11/2003 | Goss et al. | |
| 6,675,387 B1 | 1/2004 | Boucher et al. | |
| 6,721,808 B1 | 4/2004 | Singh | |
| 6,751,665 B2 | 6/2004 | Philbrick et al. | |
| 6,897,870 B1 | 5/2005 | Clegg | |
| 6,922,721 B1 | 7/2005 | Minborg et al. | |

(Continued)

FOREIGN PATENT DOCUMENTS

EP   1585009 A2   10/2005

OTHER PUBLICATIONS

Dino Esposito "Making SharePoint Web Parts Interact", Jun. 15, 2005 Also Available at: http://www.theserverside.net/tt/articles/showarticle.tss?id=WebParts2.

(Continued)

*Primary Examiner* — Kyung-Hye Shin (57) ABSTRACT

Embodiments described herein are based on the principle that shells execute commands as units of characters sent within a message. Accordingly, embodiments herein provide for establishing a remote processing session for commands by using a binding mechanism that binds a series of commands to a remote shell using a message rather than a binary stream of data. More specifically, embodiments herein provided for a mechanism of encapsulating both a command and a binding mechanism (e.g., a shell identifier and/or shell token) into a single message. Accordingly, the binding mechanism can be used throughout the lifetime of the session and allows for modeling the shell processor session (its lifetime) as a series of commands, rather than as a series of characters. In addition, note that because the binding mechanism for the shell sessions is sent within messages, the problems associated with binary or character-by-character establishment of current shell sessions are overcome.

20 Claims, 5 Drawing Sheets

U.S. PATENT DOCUMENTS

| | | | |
|---|---|---|---|
| 6,981,031 | B2 | 12/2005 | French et al. |
| 7,047,526 | B1 | 5/2006 | Wheeler et al. |
| 7,222,147 | B1 | 5/2007 | Black et al. |
| 7,243,124 | B1 | 7/2007 | Gardner et al. |
| 7,266,616 | B1 | 9/2007 | Munshi et al. |
| 7,290,263 | B1 | 10/2007 | Yip et al. |
| 7,421,658 | B1 | 9/2008 | Sharma et al. |
| 7,454,785 | B2 | 11/2008 | Kerstens et al. |
| 7,478,380 | B2 | 1/2009 | Schmidt et al. |
| 7,516,208 | B1 | 4/2009 | Kerrison et al. |
| 7,533,141 | B2 * | 5/2009 | Nadgir et al. ............ 709/200 |
| 2002/0083216 | A1 | 6/2002 | Hickson et al. |
| 2002/0107951 | A1 | 8/2002 | Teague et al. |
| 2002/0129067 | A1 | 9/2002 | Dames et al. |
| 2003/0037132 | A1 * | 2/2003 | Abdollahi et al. ........ 709/223 |
| 2003/0120762 | A1 | 6/2003 | Yepishin et al. |
| 2003/0156132 | A1 | 8/2003 | Gn et al. |
| 2003/0163570 | A1 | 8/2003 | Hendley et al. |
| 2003/0200254 | A1 | 10/2003 | Wei |
| 2003/0225829 | A1 | 12/2003 | Pena et al. |
| 2004/0015742 | A1 | 1/2004 | Olson |
| 2004/0148565 | A1 | 7/2004 | Davis et al. |
| 2004/0148569 | A1 | 7/2004 | Sengodan |
| 2004/0158638 | A1 | 8/2004 | Peters et al. |
| 2004/0163090 | A1 | 8/2004 | Ledru et al. |
| 2004/0221062 | A1 | 11/2004 | Starbuck et al. |
| 2004/0255269 | A1 | 12/2004 | Santori et al. |
| 2004/0261083 | A1 | 12/2004 | Alcazar et al. |
| 2005/0021652 | A1 * | 1/2005 | McCormack ............ 709/207 |
| 2005/0039192 | A1 | 2/2005 | Chavez et al. |
| 2005/0060693 | A1 | 3/2005 | Robison et al. |
| 2005/0137861 | A1 | 6/2005 | Dideriksen et al. |
| 2005/0138111 | A1 | 6/2005 | Aton et al. |
| 2005/0178843 | A1 | 8/2005 | Frohlich et al. |
| 2005/0182966 | A1 * | 8/2005 | Pham et al. ............... 713/201 |
| 2006/0026601 | A1 | 2/2006 | Solt, Jr. |
| 2006/0048110 | A1 | 3/2006 | Medvedev |
| 2006/0053158 | A1 | 3/2006 | Hall et al. |
| 2006/0167897 | A1 | 7/2006 | Jones et al. |
| 2006/0200488 | A1 | 9/2006 | Chu-Carroll et al. |
| 2007/0006153 | A1 | 1/2007 | Sultan |
| 2007/0118642 | A1 | 5/2007 | Kumbalimutt |
| 2007/0124005 | A1 | 5/2007 | Bourakov et al. |
| 2007/0192496 | A1 | 8/2007 | McCollum et al. |
| 2007/0192503 | A1 | 8/2007 | McCollum et al. |
| 2007/0192773 | A1 | 8/2007 | McCollum et al. |

OTHER PUBLICATIONS

.Net Framework Class Library "Page.OnPreRenderComplete Method", retrieved on Feb. 23, 2010. Also Available at: http://msdn.microsoft.com/en-us/library/system.web.ui.page.onprerendercomplete.aspx.

Dreamweaver Article "Using Events to Interact with Controls", 1995-2005 Macromedia, Inc.

"Introduction to the Internet Date" Nov. 1, 2002.

S. Lehtinen, *The Secure Shell (SSH) Protocol Assigned Numbers*, Networking Working Group—Request for Comments: 4250, (C. Lonvick, ed. Jan. 2006). (Format: TXT=44010 bytes) (Status: Proposed Standard), (PDF enclosed entitled Document 1, 17pgs.).

T. Ylonen, *The Secure Shell (SSH) Protocol Architecture*, Networking Working Group—Request for Comments: 4251 (C. Lonvick, ed. Jan. 2006). (Format: TXT=71750 bytes) (Status: Proposed Standard), (PDF enclosed entitled Document 2, 25pgs.).

T. Ylonen, *The Secure Shell (SSH) Authentication Protocol*, Networking Working Group—Request for Comments: 4252 (C. Lonvick, ed. Jan. 2006). (Format: TXT=34268 bytes) (Status: Proposed Standard), (PDF enclosed entitled Document 3, 13pgs.).

T. Ylonen, *The Secure Shell (SSH) Transport Layer Protocol*, Networking Working Group—Request for Comments: 4253 (C. Lonvick, ed. Jan. 2006). (Format: TXT=68263 bytes) (Status: Proposed Standard), (PDF enclosed entitled Document 4, 26pgs.).

T. Ylonen, *The Secure Shell (SSH) Connection Protocol*, Networking Working Group—Request for Comments: 4254 (C. Lonvick, ed. Jan. 2006). (Format: TXT=50338 bytes) (Status: Proposed Standard), (PDF enclosed entitled Document 5, 21 pgs.).

J. Schlyter & W. Griffin, *Using DNS to Securely Publish Secure Shell (SSH) Key Fingerprints*, Networking Working Group—Request for Comments: 4255 (Jan. 2006). (Format: TXT=18399 bytes) (Status: Proposed Standard), (PDF enclosed entitled Document 6, 8pgs.).

F. Cusack & M. Forssen, *Generic Message Exchange Authentication for the Secure Shell Protocol (SSH)*, Networking Working Group—Request for Comments: 4256 (Jan. 2006). (Format: TXT=24728 bytes) (Status: Proposed Standard), (PDF enclosed entitled Document 7, 10 pgs.).

J. Galbraith & P. Remaker, *The Secure Shell (SSH) Session Channel Break Extension*, Networking Working Group—Request for Comments: 4335 (Jan. 2006). (Format: TXT=11370 bytes) (Status: Proposed Standard), (PDF enclosed entitled Document 8, 5 pgs.).

Modes. M. Bellare, et al., *The Secure Shell (SSH) Transport Layer Encryption*, Networking Working Group—Request for Comments: 4344 (Jan. 2006). (Format: TXT=27521 bytes) (Status: Proposed Standard), (PDF enclosed entitled Document 9, 10 pgs.).

B. Harris, *Improved Arcfour Modes for the Secure Shell (SSH) Transport Layer Protocol*, Networking Working Group—Request for Comments: 4345 (Jan. 2006). (Format: TXT=8967 bytes) (Status: Proposed Standard), (PDF enclosed entitled Document 10, 4 pgs.).

M. Friedl, et al., *Diffie-Hellman Group Exchange for the Secure Shell (SSH) Transport Layer Protocol*, Networking Working Group—Request for Comments: 4419 (Mar. 2006). (Format: TXT=18356 bytes) (Status: Proposed Standard), (PDF enclosed entitled Document 11, 8 pgs.).

B. Harris, *RSA Key Exchange for the Secure Shell (SSH) Transport Layer Protocol* Networking Working Group—Request for Comments: 4432 (Mar. 2006). (Format: TXT=16077 bytes) (Status: Proposed Standard), (PDF enclosed entitled Document 12, 7pgs.).

J. Hutzelman, et al., *Generic Security Service Application Program Interface (GSS-API) Authentication and Key Exchange for the Secure Shell (SSH) Protocol*, Networking Working Group—Request for Comments: 4462 (May 2006). (Format: TXT=65280 bytes) (Status: Proposed Standard), (PDF enclosed.

Distributed management Task Force, Inc., *Server Management Command Line Protocol Specification (SM CLP)*, Version 1.0 (Status: Final Standard), Dec. 13, 2005. DSP0214., (PDF enclosed entitled Document 14, 230 pgs.).

* cited by examiner

SHELL SESSIONS

CROSS-REFERENCE TO RELATED APPLICATIONS

This application claims priority to U.S. Provisional Application No. 60/773,954 filed Feb. 16, 2006 entitled "REMOTE COMMAND-LINE SHELL PROTOCOL", the contents of which are incorporated herein by reference in its entirety. This application also relates to the following U.S. patent application Ser. Nos. 11/469,408, 11/469,428, and 11/469,429, filed on the same day herewith and entitled "SHELL SESSIONS", "SHELL INPUT/OUTPUT SEGREGATION", and "SHELL OPERATION FLOW CHANGE", respectively, the contents of each are also incorporated herein by reference in their entirety.

BACKGROUND

Command-line interpreters or shell processors are a common way to interact with a computer system. Commands are entered as a sequence of typed characters (e.g., text and control characters) from a keyboard, and output is then received as a string of text. Such sequences typically take on the form of "do something", "how", and "to what". In effect, the do something is a verb, how an adverb (e.g., should the command be executed "verbosely" or "quietly"), and the to what typically refers to one or more files on which the command should act. Included within these command sequences may be other characters such as inputs to the command, redirection characters to indicate where to route output, as well as other control characters.

Command-line interfaces were some of the very first interactive interfaces in use. In spite of the advent of the graphical user interface (GUI), command-line shells remain critical administrative tools because the user commands can be easily batched to automatically perform more complex tasks without the user interaction. The modern operating systems support a number of command-line interpreters that allow users to interact with the system by entering commands from the keyboard and examining the text output, either directly or with the help of utilities built into the shell or which are designed to interact with it. They also allow the sequences of commands be executed on behalf of the user in the batch mode.

As mentioned above, historically such shell command processors are character-oriented. This means that the shell command processor accepts character-by-character input from the user, waiting for a specific character (e.g., "Carriage return" or "Enter") to signal that the shell should examine the input and try to execute it. When this character is supplied, the processor parses the input, determines if it is a legal command and begins executing it. If it is not a legal command, then an error is usually returned. If it is a legal command, then the command executes and may generate character output of its own, which can be examined by the operator.

The paradigm employed by the user is typically then to "open" the shell, supply characters to it via the keyboard and whenever the shell receives as input the Enter key (or other appropriate character depending on the syntax used), it attempts to process all characters it has received so far as a unit. Once the shell processor executes each unit as a command, it then reports the output. If an erroneous input was encountered, the processor may return a set of characters to the user which includes an error message. This cycle then repeats until the user "closes" the shell processor by terminating it or exiting the program.

As computers became connected via networking, it became necessary to be able to execute such commands remotely. Accordingly, a number of well-known remote shell protocols were developed (e.g., Telnet, Secure Telnet, Secure Shell etc.), which also function on character-by-character basis as if the keyboard was being remoted, rather than the command processor. Once the shell is opened, the characters flow back and forth and the shell protocol is essentially unaware of when a command is executed, or if indeed any command was ever executed. In other words, the protocols simply pass the input and output characters back and forth. Although this allows an operator to be present in one location and to execute commands against a computer in another, there are a number of efficiency, interoperability, and other problems for such techniques.

For example, since some commands require an input stream to process, there are occasions where this character-by-character approach can result in incorrect behavior. Take for instance, during a failure scenario in which the precise character sequence may be omitted by a command or the shell processor. In such case, input streams may be mistaken for the next command or the next command may be mistaken for an input stream of the previous command. As an example, take a command where input thereto is file. If the return character (e.g., "Enter") for executing the command is not received before the input characters from the file, one of the input characters (i.e., a return character) within the file may be mistaken for the execution command.

Similarly, even if there is no faulted state (e.g., in the above example the return character is received before the input characters), there are situations wherein the input characters can be mistaken for other commands and or controls of the currently executed command. In other words, because the character-by-character input is not necessarily separated from the character-by-character command and control streams, an input with a character string similar to a command or control string may be mistaken for such function. For instance, if a command is being executed on an input string where one character string is the same as a terminate command sequence (e.g., Ctrl^X, Ctrl^C, etc.), the processing may be mistakenly stopped. Of course, depending on the mistaken input string, other command or control operations may cause even more problematic responses such as relocation or renaming of files, deletion or removal of files, shutdown of the entire system, or other harmful operations.

Still, other problems with current character-by-character protocols for remotely operating a shell process include: (1) mistakes are not recognized early in the processing of a command; and (2) these systems typically are not platform or language agnostic. More specifically, because the client simply acts as an extension of a key board, such clients typically do not know if a command is legal, if and when it is executed, and/or what type of operating system or syntax is used by the shell process. As such, a mistaken command or input is sent over the network wire and not recognized early in the processing cycle. Further, the user needs to know and adjust character usage based on the particular type of protocol employed (e.g., UNIX shell, SSH, etc.) at the remote shell. Accordingly, the above and other drawback and deficiencies of current command-line shell protocols cause efficiency, interoperability, and other various problems.

BRIEF SUMMARY

The above-identified deficiencies and drawback of current remote command-line mechanisms are overcome through example embodiments of the present invention. For example, embodiments described herein provide for establishing a command-line shell processing session by providing a binding mechanism within a message rather than a binary or character-oriented stream of data. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

At a remote computing system for executing a command-line, and in accordance with one example embodiment, a request message is received to open a shell at a remote command-line processor. A binding mechanism is then provided for use in transferring commands to the shell for execution. Thereafter, an execution request message is received to execute a command, wherein the execution request message includes the command as a unit and the binding mechanism.

A similar example embodiment at a client device in a network computing environment also provides for establishing a remote processing session for commands by using a binding mechanism that binds a series of commands to a remote shell using a message rather than a binary stream of data. In this embodiment, a request message to open a shell at a remote command-line processor is sent. Thereafter, a binding mechanism is received for use in transferring commands to the shell for execution. Further, an execution request message is sent to execute a command, wherein the execution request message includes the command as a unit and the binding mechanism.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for: (1) delivering commands as structured atomic units rather than character-oriented transmissions; (2) modeling the shell lifetime as a series of commands; (3) modeling asynchronous control signals that change the shell operation flow as special types of messages rather than characters; and (4) modeling the data exchange between the client and remote shell as streams of dedicated input and output messages—i.e., not mixing commands and input/output streams. The embodiments of the present invention may comprise a special purpose or general-purpose computer including various computer hardware or modules, as discussed in greater detail below.

Embodiments described herein are based on the principle that shells execute commands as units of characters. Accordingly, embodiments herein provide for a sending side with enough intelligence to isolate each command, examine it, perform some levels of validation, and deliver a structured representation of the command to the remote processor before doing any network operations. More specifically, embodiments herein provided for a mechanism of identifying a command and encapsulating the command into a single message (e.g., a SOAP, HTTPS, or other type message), which is then sent to a remote shell for processing as an entire unit. Accordingly, embodiments herein treat the command as a single unit, rather than as a character-oriented transmission.

Other embodiments also consider that the user input (if any) is additional information for running the command, but has different semantics than the command itself. Accordingly, embodiments herein treat such user supplied data as one or more input streams. Similarly, embodiments further contemplate that the command emits both normal output and status or error codes. As such, embodiments treat these data as output streams. Since the output of one command may be chained to become the input of the next, a formal mechanism for designating both input and output streams and keeping them segregated from the commands themselves is described herein.

The above and other embodiments that describe this two-part model of separating commands from streams and removing the character-oriented transmission have several advantages. First, network usage is more efficient. Since the minimum unit of transmission for a network card is typically 512 octets or more, in the character oriented protocols each character involved in assembling command may require an entire network packet. In the model described herein, only one message is actually delivered once it is time to execute a command.

Security and correctness of the command is also improved, since the command is an isolated unit and it can be examined in its entirety and checked against an access and validity control list before attempting to execute it. In other words, a certain level of security and validation can be performed on the sending side of the network, thus errors can be recognized early in the processing cycle.

In addition, isolating the commands in units eliminates the distinctions of how commands are delivered to the processor; thus making the system platform and language agnostic. For example, the commands can be encoded using SOAP or in HTTP requests to isolate them from the underlying differences of shell processors in different operating systems. On the other hand, the character-oriented protocols reflect the behavior of the operating system directly; and therefore, the user is required to understand the language or syntax used by the remote shell.

Still other embodiments provide for some special cases of asynchronous control signals that change the shell operation flow. For example, in cases where the user would like an early termination of a command in-progress, some type of "control-break" or other character string has typically been present in command shells. Accordingly, embodiments described herein model this and other control signals as dedicated messages, rather than a special character in the input stream.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

FIG. 1 illustrates a network configured to utilize message protocol handlers for remote command-line shell processing in accordance with example embodiments. As shown, a client 105 includes a command-line interface 115, which allows a user to input commands using a keyboard or other similar interface. In accordance with example embodiments, such commands can then be evaluated and processed by the message protocol handler 125. In other words, the message protocol handler 125 defines an interpretation mechanism that can isolate commands, examine them, and perform various levels of validation and other operations as described in greater detail below. These commands are then encapsulated within a message (e.g., SOAP, HTTPS, etc.) and transferred across the network 100 to the remote 110 side, wherein the message protocol handler 130 processes the message and passes the command to the command-line shell processor 120 for further processing purposes.

Figure 1A:
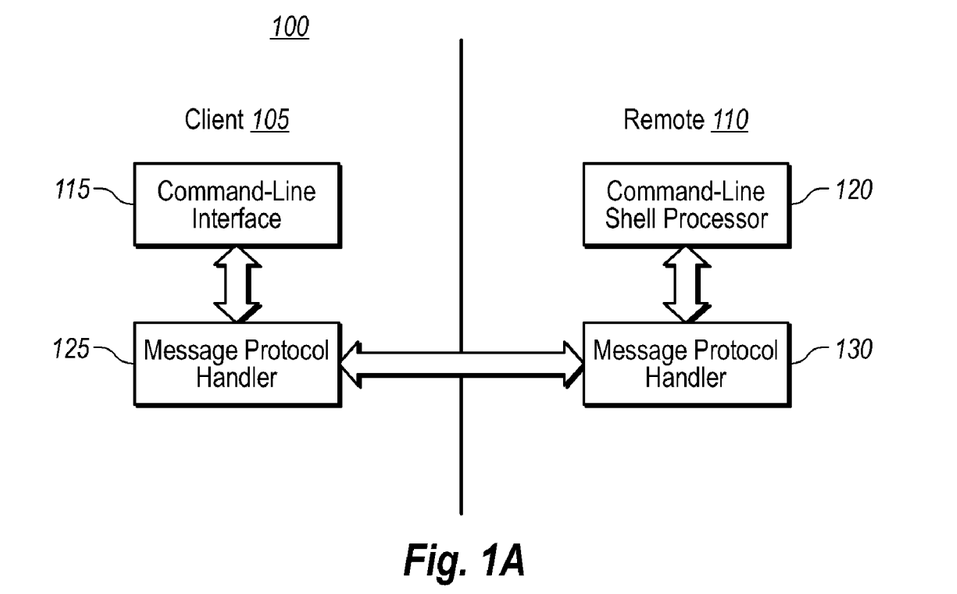
FIG. 1A illustrates a network that utilizes message protocol handlers for remote command-line shell processing in accordance with example embodiments.

Note that the use of the message protocol handler 125 allows for commands to be processed in a platform and language agnostic manner. In particular, the message protocol handler 125 on the client 105 side is configured to encapsulate the command into a message independent of the particular type of syntax used for the command. Similarly, the message protocol handler 130 on the remote 110 side can evaluate the command written independently of the syntax for the shell processor 120, but still allow the shell processor 120 to process the command regardless of the type of operating system used or the specific language implemented. In other words, the message protocol handlers 125, 130 transform the command into and convert the command from an independent form as defined within the message itself.

In other words, one aspect of these embodiments is that the platform-specific characteristics of the remote processor 120 are hidden under the message model, which is uniform across platform boundaries. By modeling the shell lifetime (as described in greater detail below) and execution of commands under messages (e.g., SOAP), essential and troublesome differences in shell 120 processors are hidden.

Note that although the following embodiments can be described as utilizing the above handlers 125, 130 for providing the commands in a platform and language agnostic manner, such conversion is not necessary for utilizing such embodiments. Further, it is also noted that although embodiments described herein will typically be implemented between a client and remote shell processor in a network environment, some of the embodiments can also be applied to local machines as well. Also note that any number of modules and configurations for performing and modeling embodiments described herein are also contemplated. Accordingly, any specific use of any particular encoding format, language syntax or operating system, design layout, or use of a remote or other particular shell module for implement embodiments described herein is for illustrative purposes only and is not meant to limit or otherwise narrow the scope of embodiments herein described unless otherwise specifically claimed.

Figure 1B:
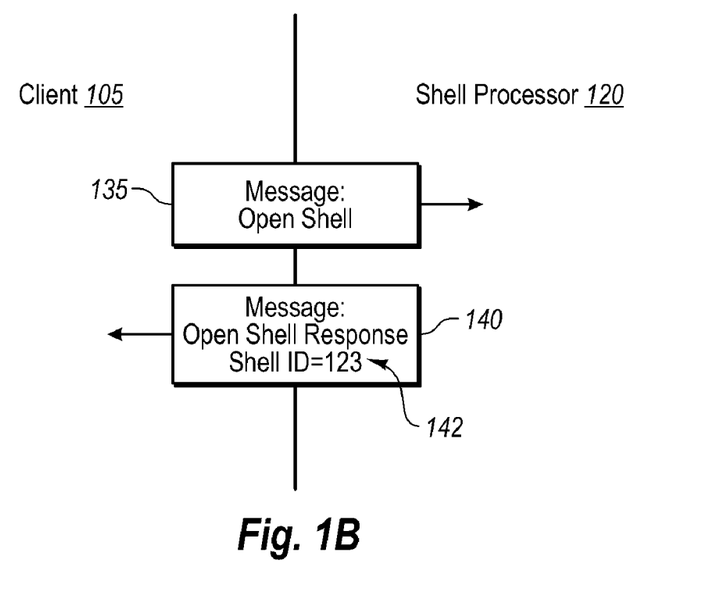
FIG. 1B illustrates the use of an open message and return shell identifier for establishing a command session in accordance with example embodiments.

Regardless of the type of computing system used, as shown in FIG. 1B, when a client 105 wants to open a shell 120 for command processing, embodiments allow for issuing a structured open shell message 135—which directly models the concept of opening the command shell processor. Accordingly, this embodiment mimics the act of opening a "command window" locally within an operating system environment. The message 135 may then be delivered to the remote machine 110, which locally opens a "real" shell 120 and attaches its input and output to the remote session. This initial message 135 is typically where the environment variables for the shell 120, default directory (not shown), and other initialization can be performed (e.g., overwriting the default variables, adding new variables to control the commands behavior, etc.).

Note that in this and other embodiments described herein, the processing that occurs by a shell processor 120 may be a virtual process that mimics the behavior of an actual implementation of such processing. In other words, the operations that occur may appear to happen at a particular shell processor 120; however, other modules or components mimic such behavior of processing a command or implementing a signal control as described in greater detail below. Accordingly, any reference to a shell processor 120 or behavior thereof as described herein and claimed should be broadly construed to include virtual machines that act on behalf or similar to an actual shell processor.

On the shell processor 120 side (e.g., on a server-side implementation), an open shell response message 140 may be sent back to the client 105 for acknowledging the opening of the shell 120. Note that in one embodiment, an identifier 142 or token can be attached to the message 140, which identifies the shell 120 (e.g., Shell ID=123 in the example shown). Accordingly, the use of the binding mechanism 142 (i.e., the identifier 142 or shell token) can be used throughout the lifetime of the session as described in greater detail below. Note that this will allow for modeling the shell processor 120 session (its lifetime) as a series of commands, rather than as a series of characters. Further note, this mechanism also allows for opening several shell 120 sessions, thereby allowing for simultaneous processing of multiple command series. In addition, note that because the binding mechanism (i.e., an identifier 142 or shell token) for the shell sessions is sent within messages, the problems associated with binary or character-by-character establishment of current shell sessions are overcome.

Nevertheless, it should be noted that some embodiments described herein do not necessarily need the session binding 142 mechanism or modeling as described herein. For example, if only a single session or shell process 120 is established, then the use of the shell ID 142 or token may not be needed. Accordingly, the use of the shell identifier or token for establishing a session is used herein for illustrative purposes only and is not meant to limit the scope of embodiments described herein unless otherwise explicitly claimed.

Figure 1C:
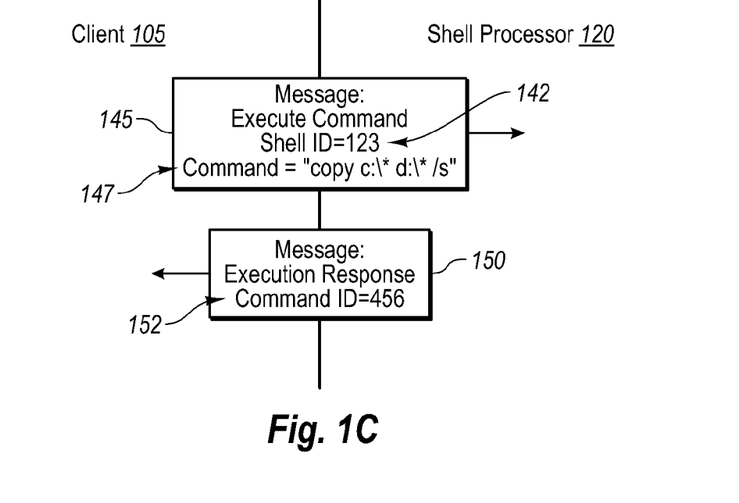
FIG. 1C illustrates using a message to send a command unit to a shell processor for execution in accordance with example embodiments.

Regardless of whether or not a shell identifier 142 is used to create or establish a session, as shown in FIG. 1C embodiments provide that when issuing command(s) to a command shell processor 120, the client 105 application can compose the complete command line unit 147 on the sending side, including, e.g., the name of the command, its switches, and other necessary information for successful execution. In other words, as previously described, embodiments herein identify the command 147, examine it, perform some validation and other high level processing on it (e.g., comparing against an access or validation control list), and encapsulating the command 147 unit into an execution command message 145 for sending the command 147 to the shell processor 120 for processing. Accordingly, embodiments herein deliver commands 147 as structured atomic units using a message-oriented protocol, as opposed to existing implementations of command shell protocols that rely on character-oriented transmission models.

Note that the command shown here is a single "copy" command; however, other types of commands, and even combinations of commands, can be included in the message. For example, the execution command message 145 may include multiple commands 147 with outputs of one piped to inputs of others. Typically, however, only one command will be included within a single message. Regardless of whether one or more commands are included in a message 145, the command(s) should be expressed as an entire unit, i.e., it should not include only a partial expression of a command 147. Accordingly, any specific type or number of command 147 within a message 145 are described herein for illustrative purposes only and should not limit or otherwise narrow the scope of embodiments unless otherwise explicitly claimed.

Further note that the execution command message 145 (as well as other messages described herein) may be any type of well known format, e.g., HTML (HyperText Markup Language), XML (eXtensible Markup Language) etc. Further, the command 147 (and other elements described herein) may be located in any portion of the message, e.g., the header, body, or other fields. Also note that in the case where the session or lifetime of the shell is established using an identifier or token 142, the execution command message 145 should also include the token 142 for identifying which shell 120 should execute the operation.

In response to the execution command message 145, typically the shell processor 120 will issue an execution response message 150. Note that the execution response message 150 may be part of the message output as described in greater detail below. For example, the execution response message 150 may simply be a status code, error, or other acknowledgement message that indicates whether or not the command 147 has or has not been executed. Also note that the execution response 150 may include a command identifier or token 152 (shown as command ID=456 in this example) that can be used for such things as identifying or binding specific input and output to a command 147, as described in greater detail below.

Note, however, that similar to the shell identifier, the command token 152 is not necessary for some embodiments described herein. For example, if multiple commands 147 are not being executed within a session and/or if no input/output is generated, there may be no need for such command identifier 152. Also note, that the execution response 150 may or may not also include the shell identifier 142 as needed and previously described.

Figure 1D:
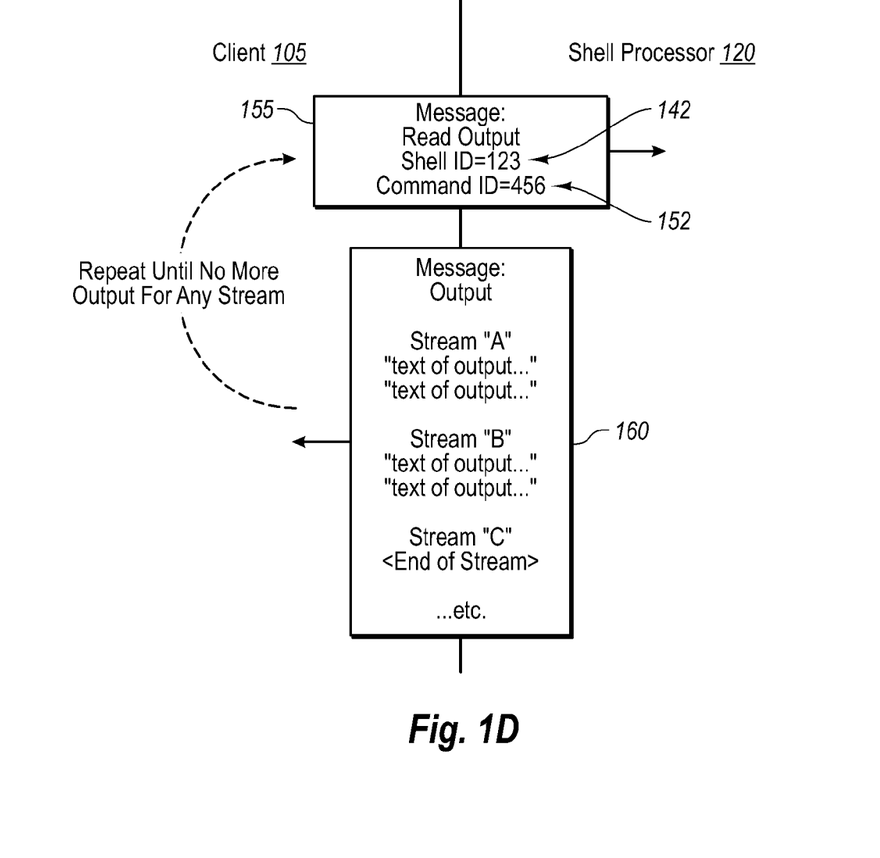
FIG. 1D illustrates the streaming of the output for an executed command in accordance with example embodiments.

Nevertheless, as shown in FIG. 1D, the client 105 should begin extracting any output 160 generated by the execution of command 147, as most commands will emit output and eventually some kind of final status (e.g., the status code, error code, or other acknowledgement messages previously mentioned). In accordance with one embodiment, this process occurs in a loop as shown, where one or more streams of output 160 (e.g., a standard out stream, standard error stream, or other output stream) are received by client 105 and acknowledged using read output message 155.

Typically, the client 105 continues to repeat the above described loop until there is no more output 160 for any stream emitted (e.g., stream "A", "B", "C". etc.) by execution of the command 147. In one embodiment, the output 160 of each stream emitted (e.g., stream "A", "B", "C". etc.) by the command 147 is segregated within message block 160. At some point, there will typically be an end-of-stream marker, as in Stream "C", meaning the client 105 will get no more output for that stream (note that the end-of-stream marker may be used to indicate an end to all streams within the output and/or such streams or optional such that streams may be implied to end if a command terminates—e.g., returns exit code in the response). Eventually, all streams involved in the processing of command 147 will have emitted the end-of-stream marker, and an end-of-command marker will appear in the response message 160. Also note, that embodiments allow for configuring of the types of streams that may be output to client 105, e.g., stream "A" set to true, while stream "B" may be set to false.

Once the command 147 has terminated by emitting all its output 160, the client 105 may issue another command 147 as described above. Nevertheless, as previously mentioned, some embodiments also allow more than one command 147 to simultaneously execute against the same shell 120 instance, or against multiple shell 120 sessions as the case may be.

Note that instead of multiple round trips to communicate each output character, the output 160 is retrieved in chunks of characters. Accordingly, a given response 160 may have a large amount of data for one or many streams as opposed to a character-oriented transmission of typical command shell protocols. Thus, the output 160 is more efficiently received and processed for display and other use. Also note, that typically where necessary, as previously mentioned, the output message 160 should include the shell and/or command identifiers 142, 152. In such instance, the client 105 may be receiving, and the shell processor 120 may be generating, multiple outputs for multiple execution of commands 147 in multiple shell 120 sessions. Further, as will be described in greater detail below, such output 160 streams may also be dynamically adjusted in rate generated and sent based on various considerations and relative to received input.

Figure 1E:
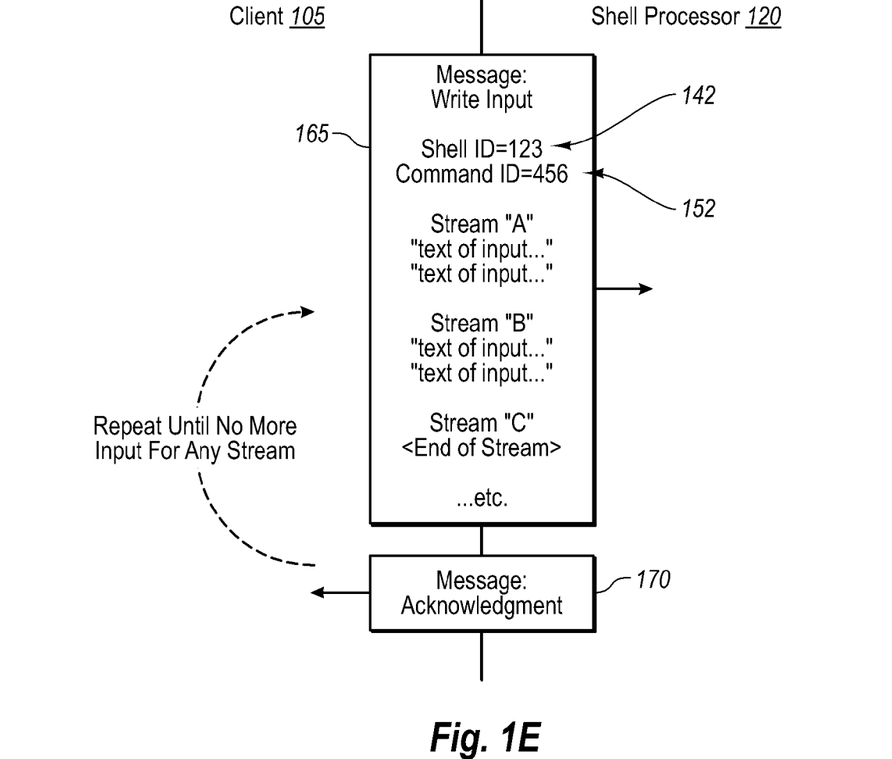
FIG. 1E illustrates the separation of the input stream message from the command message in accordance with example embodiments.

As previously mentioned, some commands 147 may require input as well. In such instance, as shown in FIG. 1E, embodiments herein allow for input streams 165 to be "fed" to the command 147 after the command execution message 145 (and thus the command 147) is sent to the shell processor 120 (note, however, that some embodiments allow for the input to also be included in the command execution message 147 when the command and input can still be keep separate yet identifiable—e.g., a SOAP message with the command in the header and the input in the body, etc.). In the case where a command identifier or token 152 is used, the input will typically be sent after the command ID 152 is known. Also, in the instance where shell identifier 142 is used, such identifier 142 should be included in the input 165 to identify the appropriate shell 120 session. Similar to the output stream 160 described above, the streaming of the input 165 occurs in a loop type fashion until there is no more input data to feed to the command 147 on any stream (e.g., stream "A", "B", "C", etc.). In other words, acknowledgment messages 170 are received by client 105 for those streams of input data within the write input message 165 successfully delivered to the shell processor 120, and the client 105 continually streams the input 165 to the shell processor 120 until all input is acknowledged 170 as received. Also note, that embodiments allow for configuring of the types of streams that may be input, e.g., stream "A" set to true, while stream "B" may be set to false.

Note that similar to the output streams 160, instead of communicating each input on a character-by-character basis, the input is sent in chunks of characters. Accordingly, a given write input message 165 may have a large amount of data for one or many streams as opposed to a character-oriented transmission of typical command shell protocols. Thus, the input is more efficiently received and processed. Also note that where necessary, as previously mentioned, the input message 165 should include the shell and/or command identifiers 142, 152. In such instance, the shell processor 120 may be processing multiple inputs for multiple commands 147 in multiple shell 120 sessions.

Other embodiments allow for the processing of the input 165 to occur asynchronously and simultaneously to extracting the output 160 as already described above with read output messages 155. Accordingly, since some commands 147 may require input 165 at a faster/slower rate than they generate output 160, embodiments herein can statically or dynamically adjust the input/output rate accordingly. In other words, there may be an impedance mismatch between the input 165 and output 160 message flows. Further, the flows may be statically or dynamically adjusted based on any number of issues, such as timeout issues, bandwidth issues, preferred streams, etc. Further, the flow of either the input 165 or output 160 may be adjusted based on, hint messages, configuration settings, or any other well known mechanisms.

Figure 1F:
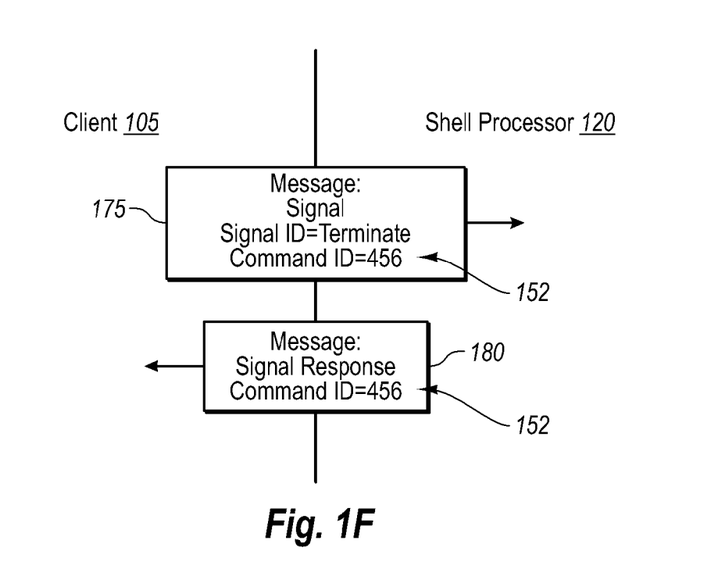
FIG. 1F illustrates the use of messages for transmitting control operations for a shell session in accordance with example embodiments.

Still other embodiments allow for the use of special messages for asynchronously controlling or changing the flow of the shell 120 operation flow. For example, as shown in FIG. 1F, signal messages 175 may be used to terminate, pause, resume, or otherwise modify the execution of a command. In other words, if a user wishes to change the execution state of a command 147, client 105 can create a signal message 175 and send such message to the shell processor 120, which can take the appropriate action as desired. Note that by modeling the control or signal commands as discrete messages 175 (as well as other embodiments modeled and described herein), such commands are not mistakenly executed on a command as previously described for those protocols that use a character-by-character transmission.

Similar to other processes herein described, a signal response message 180 may be returned to the client indicating the state of the command 147. Note that such response message 180 may be an error or other type of acknowledgement message 180 based on such things as the status of the command 147, the type of modification or change desired 175 (e.g., whether or not such modification is legal), etc. Also note that in the case that command and/or session identifiers 142, 152 are used, the signal message 175 and response 152 should typically include the appropriate tokens for proper processing. Also note, that the signal identifier (and other identifiers herein described) may be included in any part of the message, may appear as a code, can be a flag within a particular field, or can be identified in other similar well known manners.

Figure 1G:
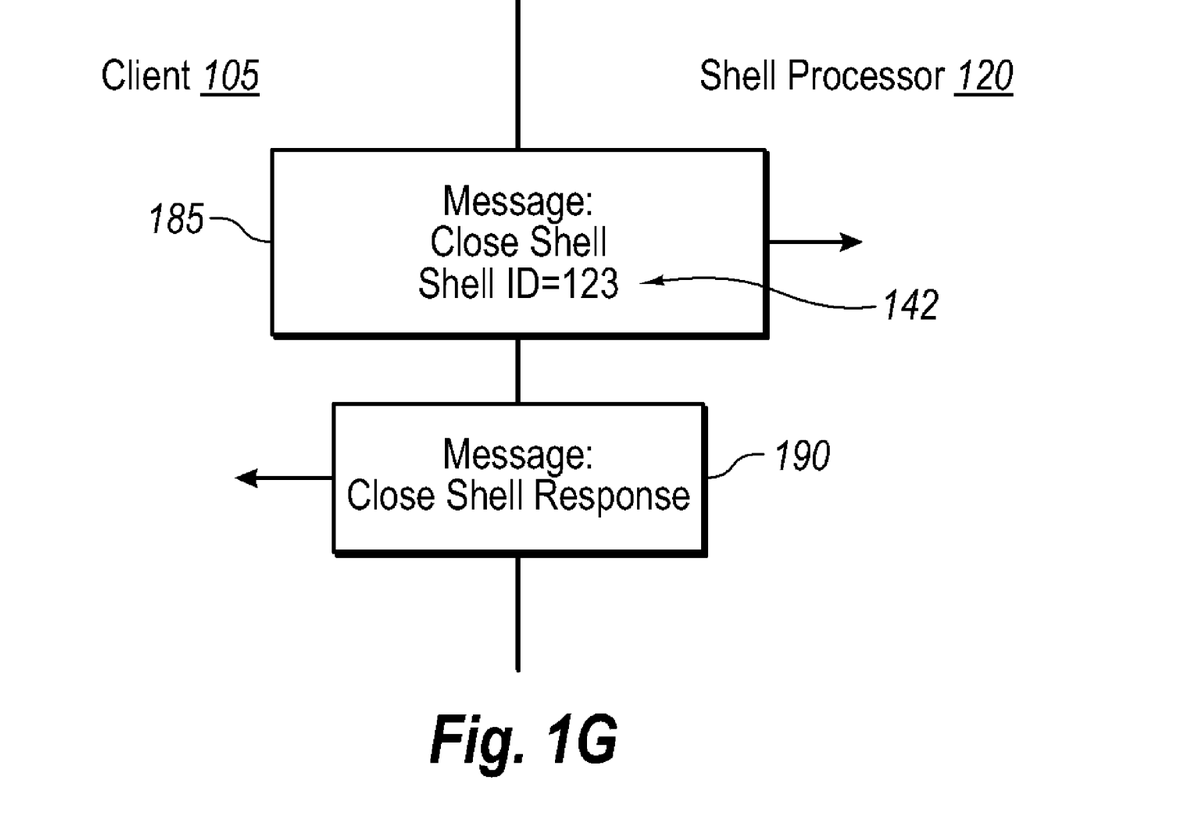
FIG. 1G illustrates the use of a close message for terminating a command session in accordance with example embodiments.

When the client 105 has no further need of the shell 120, embodiments also allow for the closure of the shell by sending a close shell message 185 as shown in FIG. 1G. If the session is established as previously described, the close shell message 185 should include the shell identifier 142 (shown as Shell ID=123). In any event, when the shell processor 120 receives the request to close the shell 185, the shell session 120 will terminate and an appropriate state or close shell response 190 may be returned to the client 105, provided of course that no error has occurred.

Note that in the above embodiments various parts of the message identified may be represented using any well known uniform resource identifier (uri). For example, the commands 147, open/close sessions, shell identifier 142, command token 152, signal identifiers (e.g., terminate, pause, resume, etc.), and other parts of the message may be identified using any well known uri. Accordingly, this embodiment allows for another layer of abstraction from any specific platform or syntax used in executing command-lines within a shell process.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result.

Although the functional steps and/or non-functional acts may be described or claimed in a particular order, the present invention is not necessarily limited to any particular ordering or combination of steps and/or acts. Further, the use of steps and/or acts in the recitation of the claims is used to indicate the desired specific use of such terms.

Figure 2:
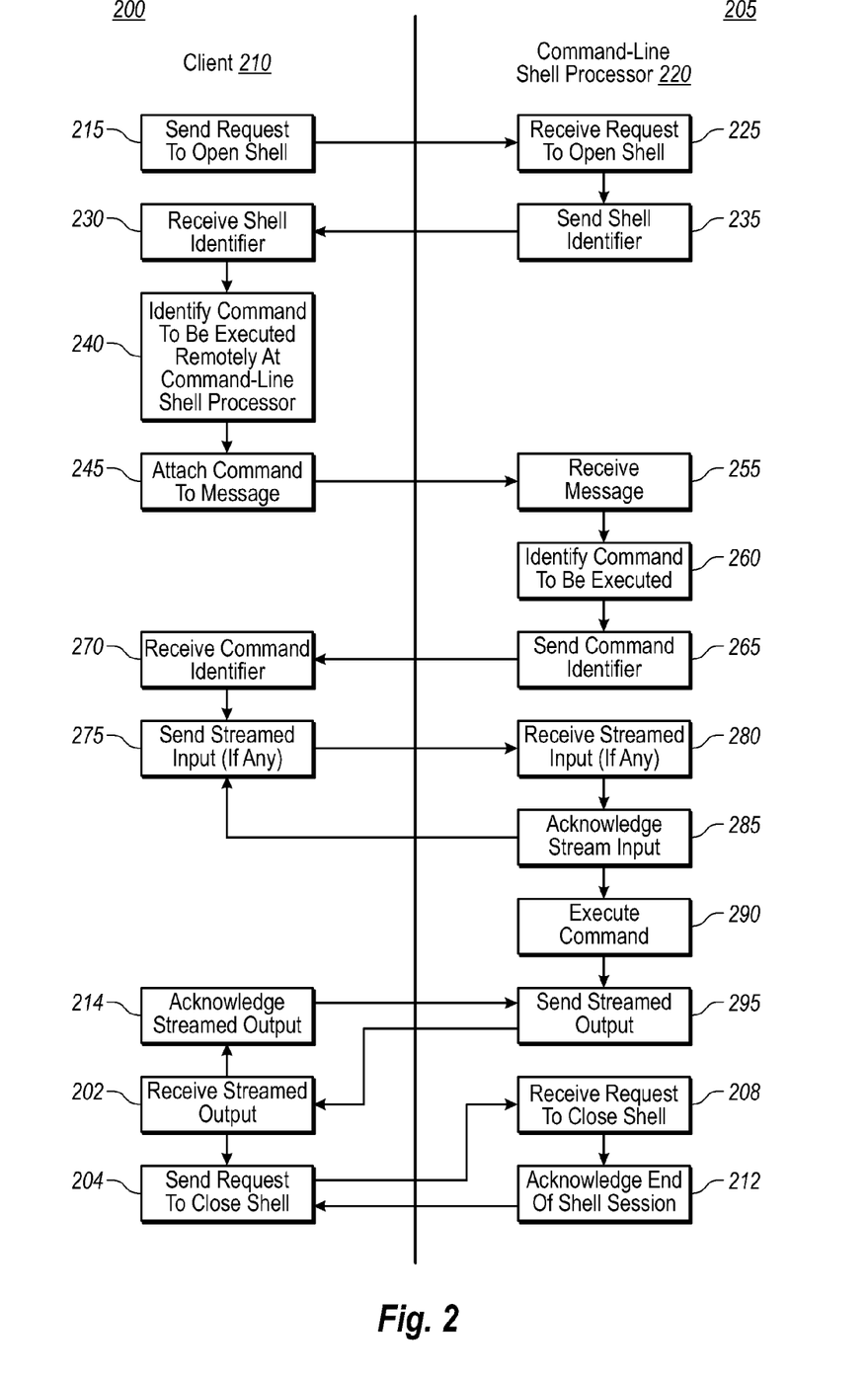
FIG. 2 illustrates a flow diagram for a protocol used in executing command-lines at a remote shell in accordance with example embodiments.

FIG. 2 illustrates a flow diagram for various exemplary embodiments of the present invention. The following description of FIG. 2 will occasionally refer to corresponding elements from FIGS. 1A-G. Although reference may be made to a specific element from these Figures, such references are used for illustrative purposes only and are not meant to limit or otherwise narrow the scope of the described embodiments unless explicitly claimed.

FIG. 2 illustrates a flow diagram for a protocol used in executing command-lines at a remote shell in accordance with example embodiments. Note that the flow diagram of FIG. 2 includes descriptions for multiple methods (e.g., 200, 205) depending on such things as the depth within the flow diagram and which side of the flow diagram is being described, i.e., client 210 or command-line shell processor 220. Accordingly, the following description of the flow diagram is not meant to be directed toward any specific method, but rather is used to generally describe embodiments used for performing one or more of the following: (1) delivering commands as structured atomic units rather than character-oriented transmissions; (2) modeling the shell lifetime as a series of commands; (3) modeling asynchronous control signals that change the shell operation flow as special types of messages rather than characters; and (4) modeling the data exchange between the client and remote shell as streams of dedicated input and output messages—i.e., not mixing commands and input/output streams.

Embodiments provide for sending/receiving 215/225 a request to open a shell. For example, client 105 may send an open shell request message 135 to shell processor 120. In the case that a session should be established, as described above, embodiments also provide for sending/receiving 235/230 a shell identifier. More specifically, upon receiving the open shell message 135, shell processor can send an open shell response 140 that includes a shell token or identifier 142, as previously described. Thereafter, client side 210 identifies 240 a command to be executed remotely on by the command-line shell processor 220, and attaches 245 the command to a message. For example, client 105 can identify command(s) 147 and include such in an execute command message 145 for sending to the shell processor 120, which is typically remote from the client 105. Note that in the case where a shell session is established, the execute command message 145 should also include the shell identifier 142.

Command-line processor side 220 receives 225 the message 145, and can then identify 260 the command 147 for execution. Thereafter, in the case where a command identifier is used, shell processor 120 can send 265 such identifier 142 to the client 105, which receives 270 such for use in sending input, or otherwise controlling the execution of the command 147 as described herein. As previously noted, the command identifier 152 may or may not be needed in accordance with example embodiments depending on such things as if multiple command 147 executions are allowed in a single session, whether or not input/output is needed, etc. For example, if write input 165 for the executing the command 165 is necessary, the command identifier 152 (and possibly even the shell identifier 142) may be included within the streamed input 165, which is sent/received 275/280 by the shell processor 120 acknowledgements 285 (e.g., error codes, etc. 170) for inputs received should also be sent 275, which process is looped until all of the input stream 165 has properly been sent to/received by 275/280 shell processor 120.

Once the command 147 and streamed input 165 (if any) has been appropriately received, the command-line shell processor side 220 can appropriately execute 290 command(s) 147. As such output 165 can be sent to/received by 295/202 client 105, with the appropriate acknowledgment(s) sent 214 to the command-line shell processor 220 side. Similar to the input streams 165, the output loop should be continued until all output 160 is received by/sent to the client 105.

Note that as previously mentioned and described, the input 265 and output 260 streams may be asynchronously and simultaneously sent/received between the client 105 and shell processor 120. In addition, such flow may be statically or dynamically adjusted based on a myriad of factors and in numerous ways. For example, the flow may be based on the amount of input 165 needed to produce a certain amount of output 160 for a particular command 147, and/or based on bandwidth or other limitations. Further, the flow may be controlled through hint messages, control settings, or other well known mechanisms.

Once the user is done with a session, a request to close the shell 185 may be sent to/received by 204/208 the command-line shell processor side 220, and an acknowledgment 190 sent 212 to the client side 210 notifying the client 105 that the shell 120 session has ended. Also note that other embodiments allow for the distribution of signal messages 175 (e.g., terminate, pause, resume, etc.) for changing the state or processing of a command 147. As with most other messages described herein, such control messages 175 can be acknowledged (or errors raised) using a signal response 180.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a remote device in a network computing environment, a method of establishing a command-line shell processing session by providing a binding mechanism within a message rather than a binary stream of data in order to bind a shell to a series of commands, the method comprising:

receiving a request message to open a shell at a remote command-line shell processor;

opening the shell;

in acknowledgement of the shell being opened, sending from the remote command-line shell processor an open shell response message providing a binding mechanism for use in transferring commands to the shell for execution; and receiving an execution request message to execute a command, wherein the execution request message includes the command as a unit and the binding mechanism, wherein each of the request message and the binding mechanism are represented by uniform resource identifiers, the execution request message being capable of including multiple commands, wherein a data exchange between a client and the remote command-line shell processor comprises one or more streams of data of dedicated input and output messages segregated from one or more of the multiple commands, wherein the dedicated input messages are received by the remote command-line shell processor, and the dedicated output messages are sent by the remote command-line shell processor as a result of execution of one or more commands at the remote command-line shell processor.

2. The method of claim 1, wherein the binding mechanism is a shell identifier, shell token, or both.

3. The method of claim 1, wherein in response to the received execution request message the method further comprises:
sending a response message that includes a command identifier for use in identifying input, output, or other signal messages related to the execution of the command.

4. The method of claim 3, wherein the response message includes a status report of the execution of the command.

5. The method of claim 1, wherein the command requires input for execution at the command-line shell processor, wherein the input is received as one or more streams of data separate from the execution message, and wherein the input includes both the binding mechanism and a command identifier.

6. The method of claim 1, wherein the execution of the command produces an output, and wherein the output is sent to a client as one or more streams of data that include both the binding mechanism and a command identifier.

7. The method of claim 1, further comprising:
receiving one or more asynchronous signal messages that include both the binding mechanism and a command identifier for changing the shell operation flow such that the execution of the command is terminated, paused, resumed, exited, or delayed.

8. The method of claim 1, wherein the command requires an input stream and the execution of the command produces an output stream, and wherein a rate of flow for the input stream is dynamically adjusted relative to a rate of flow for the output stream.

9. At a client device in a network computing environment, a method of establishing a remote processing session for commands by using a binding mechanism that binds a series of commands to a remote shell using a message rather than a binary stream of data, the method comprising:
sending a request message to open a shell at a remote command-line shell processor;
in acknowledgement of the shell being opened, receiving from the remote command-line shell processor an open shell response message including a binding mechanism for use in transferring commands to the shell for execution;
sending an execution request message to execute a command, wherein the execution request message includes the command as a unit and the binding mechanism,
wherein each of the request message and the binding mechanism are represented by uniform resource identifiers,
the execution request message being capable of including multiple commands, wherein a data exchange between the client device and the remote command-line shell processor comprises one or more streams of data of dedicated input and output messages segregated from one or more of the multiple commands, wherein the dedicated input messages are sent by the client device, and the dedicated output messages are received by the client device as a result of execution of one or more commands at the remote command-line shell processor.

10. The method of claim 9, wherein the binding mechanism is a shell identifier, shell token, or both.

11. The method of claim 9, wherein in response to the sent execution request message the method further comprises:
receiving a response message that includes a command identifier for use in identifying input, output, or other signal messages related to the execution of the command.

12. The method of claim 11, wherein the response message includes a status report of the execution of the command.

13. The method of claim 9, wherein the command requires input for execution at the shell, wherein the input is sent as one or more streams of data separate from the execution message, and wherein the input includes both the binding mechanism and a command identifier.

14. The method of claim 9, wherein the execution of the command produces an output, and wherein the output is received at a client as one or more streams of data that include both the binding mechanism and a command identifier.

15. The method of claim 9, further comprising:
sending one or more asynchronous signal messages that include both the binding mechanism and a command identifier for changing the shell operation flow such that the execution of the command is terminated, paused, resumed, exited, or delayed.

16. The method of claim 9, wherein the command requires an input stream and the execution of the command produces an output stream, and wherein a rate of flow for the input stream is dynamically adjusted relative to a rate of flow for the output stream.

17. At a remote device in a network computing environment, a computer program product for implementing a method of establishing a command-line shell processing session by providing a binding mechanism within a message rather than a binary stream of data in order to bind a shell to a series of commands, the computer program product comprising one or more computer readable storage media having stored thereon computer executable instructions that, when executed by a processor, can cause the remote device to perform the following:
receive a request message to open a shell at a remote command-line shell processor;
open the shell;
in acknowledgement of the shell being opened, send from the remote command-line shell processor an open shell response message that provides a binding mechanism for use in transferring commands to the shell for execution; and
receive an execution request message to execute a command, wherein the execution request message includes the command as a unit and the binding mechanism,
wherein each of the request message and the binding mechanism are represented by uniform resource identifiers,
the execution request message being capable of including multiple commands, wherein a data exchange between a client and the remote command-line shell processor comprises one or more streams of data of dedicated input and output messages segregated from one or more of the multiple commands, wherein the dedicated input messages are received by the remote command-line shell processor, and the dedicated output messages are sent by the remote command-line shell processor as a result of execution of one or more commands at the remote command-line shell processor.

18. The computer program product of claim 17, wherein the binding mechanism is a shell identifier, shell token, or both.

19. The computer program product of claim 17, wherein in response to the received execution request message the computer program product further comprising executable instructions that cause the command-line processor to perform the following:
send a response message that includes a command identifier for use in identifying input, output, or other signal messages related to the execution of the command.

20. The computer program product of claim 17, wherein the command requires input for execution at the command-line shell processor, wherein the input is received as one or more streams of data separate from the execution message, and wherein the input includes both the binding mechanism and a command identifiers.

\* \* \* \* \*